J. B. Atwater,
Pump Lift
Nº 19,671.   Patented Mar. 23, 1858.
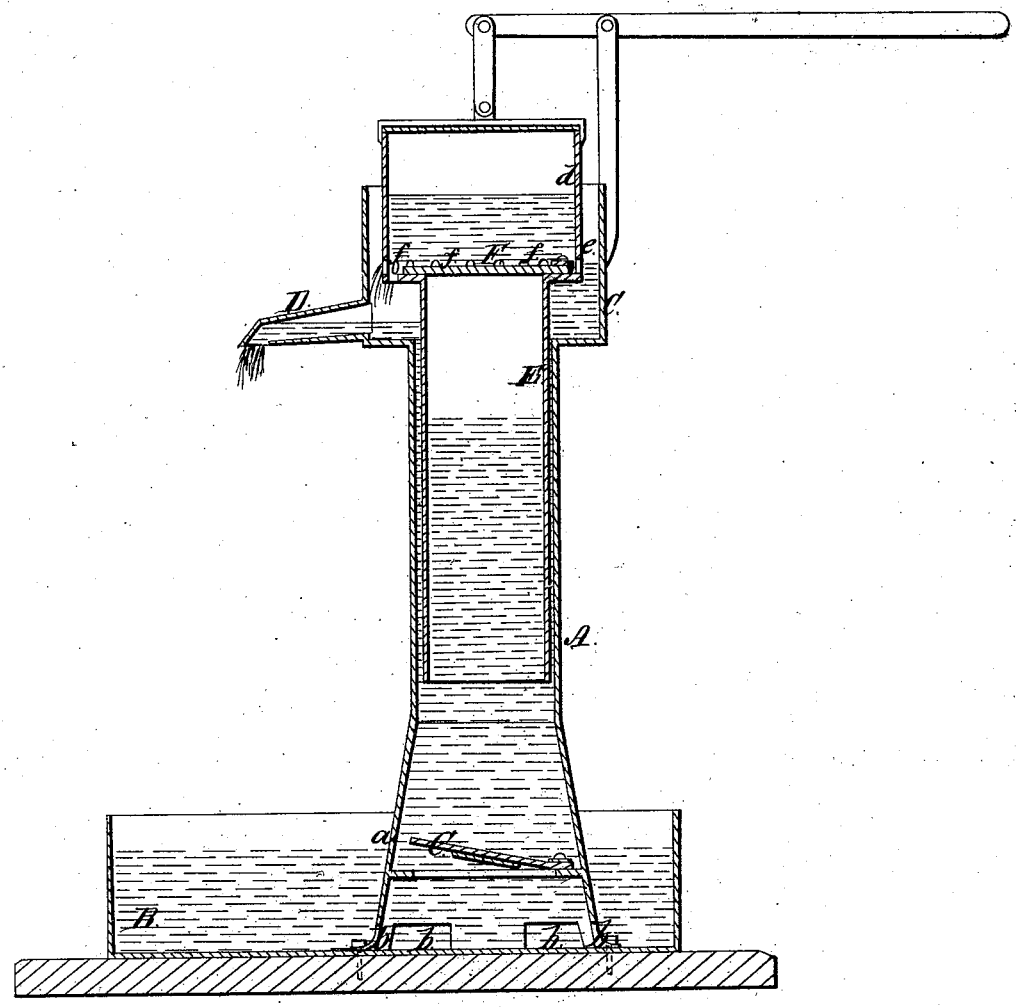

UNITED STATES PATENT OFFICE.

JAMES B. ATWATER, OF BROOKLYN, NEW YORK.

PUMP.

Specification of Letters Patent No. 19,671, dated March 23, 1858.

*To all whom it may concern:*

Be it known that I, JAMES B. ATWATER, of Brooklyn, in the county of Kings and State of New York, have invented a new and useful Improvement in Reciprocating Pumps; and I do hereby declare that the following is a full, clear, and exact description of the same, reference being had to the annexed drawing, making a part of this specification, said drawing being a vertical central section of my improvement.

This invention consists in arranging the plunger and other parts of the pump in such a manner that the water as it is raised or pumped up is made to act as an efficient packing and the pump thereby rendered extremely simple and durable and susceptible of being operated by a very small expenditure of power.

To enable those skilled in the art to fully understand and construct my invention I will proceed to describe it.

A, represents the pump cylinder. B, a reservoir in which the lower part of the cylinder B, is immersed. The lower end or part (a) of the cylinder A, is of conical form and is provided with a valve C, being equal or a trifle larger than the diameter of the cylinder A. The lower end of the cylinder is made to communicate with the reservoir B, by means of openings (b).

The upper end (c) of the cylinder A, is of larger diameter than the body or central portion and a spout D, is attached to the lower part of the enlarged portion (c) of the cylinder.

Within the cylinder A, a hollow plunger E, is placed of rather smaller diameter than the interior of the cylinder so that the sides of the plunger will not be in contact with the cylinder but a space allowed of sufficient width for water to pass freely up between the plunger and cylinder. The upper end or part (d) of the plunger E is made of larger diameter than the lower part, but a trifle smaller than the upper part (c) of the cylinder so that a space (e) is allowed all around the part (d).

Within the plunger E, and at the junction of the enlarged part (d) and the smaller part, a valve F, is placed. This valve opens upward and the diameter of its opening should be at least equal if not greater than the diameter of the smaller part of the plunger. The lower part of the enlarged portion (d) of the plunger is perforated with holes (f).

The operation is as follows: A reciprocating motion is given the plunger E, by any proper means, the valve F, closing as the plunger E, rises and the valve C, opening, so that after a few strokes of the plunger a sufficient vacuum will be produced within the cylinder A, to cause the water to be forced up within said cylinder and also up between the plunger E and cylinder A, and into the enlarged part (c) of the cylinder A, as shown by the blue lines. Every time the plunger ascends a quantity of water escapes through the valve C, said valve closing and the valve F, opening as the plunger descends to allow the water to escape into (d) from which it passes through holes (f) into the part (c) of the cylinder and out through the spout D.

After the water has once passed up into the cylinder A, it forms a packing as the space between the plunger and cylinder is kept filled and also the space (e), that is, when the pump is in operation, and the plunger E, produces a vacuum at every upward movement so that the water will be raised equally as well as by the ordinary packed plunger, but the friction attending the operation of the same will be avoided, for in my improvement the plunger is not in contact with the cylinder, and consequently there is no friction attending its operation except the very slight amount produced by the plunger in passing through the water. This is so very trifling that it is not necessary to be considered. By having the openings of the valves C, F, fully as large or rather larger in diameter than the body or smaller part of the plunger E, no resistance is offered to the plunger as it is moved up and down by the water, as the water is allowed to pass freely through the valves in a volume commensurate with the working capacity of the plunger.

There are no parts in the within described improvement that are liable to get out of repair. The valves are of the simplest kind, artificial packing is dispensed with, there is nothing to be worn or rendered inoperative by friction and the power required to operate the pump is comparatively small, as there is but a trifling friction to overcome.

Having thus described my invention what I claim as new and desire to secure by Letters Patent, is,

The arrangement of the plunger E, and cylinder A with their respective enlarged portions $c$, $d$, constructed and operating as and for the purpose set forth.

JAMES B. ATWATER.

Witnesses:
W. TUSCH,
W. HAUFF.